United States Patent [19]

Duerksen et al.

[11] Patent Number: 4,607,700
[45] Date of Patent: * Aug. 26, 1986

[54] ALPHA-OLEFIN SULFONATE DIMER SURFACTANT CYCLIC STEAM STIMULATION PROCESS FOR RECOVERING HYDROCARBONS FROM A SUBTERRANEAN FORMATION

[75] Inventors: John H. Duerksen, Fullerton; Robert G. Wall, Pinole; Jack D. Knight, Berkeley, all of Calif.

[73] Assignee: Chevron Research Company, San Francisco, Calif.

[*] Notice: The portion of the term of this patent subsequent to Dec. 3, 2002 has been disclaimed.

[21] Appl. No.: 639,973

[22] Filed: Aug. 10, 1984

[51] Int. Cl.$^4$ ............................................. E21B 43/24
[52] U.S. Cl. ..................................... 166/303; 166/309
[58] Field of Search ............................... 166/272-275, 166/303, 309; 252/8.55 D

[56] References Cited

U.S. PATENT DOCUMENTS

| | | | |
|---|---|---|---|
| B 529,836 | 2/1976 | Needham | 166/303 |
| B 569,519 | 2/1976 | Clampitt | 166/272 |
| 3,357,487 | 12/1967 | Gilchrist et al. | |
| 3,412,793 | 11/1968 | Needham | 166/272 X |
| 3,463,231 | 8/1969 | Hutchison et al. | 166/303 |
| 3,486,560 | 12/1969 | Hutchinson et al. | 166/292 |
| 3,721,707 | 3/1973 | Straus et al. | 166/303 X |
| 3,951,823 | 4/1976 | Straus et al. | 252/8.5 C |
| 3,953,338 | 4/1976 | Straus et al. | 252/8.5 C |
| 4,068,717 | 1/1968 | Needham | 166/272 |
| 4,072,191 | 2/1978 | Clampitt | 166/261 |
| 4,085,800 | 4/1978 | Engle et al. | 166/288 |
| 4,086,964 | 5/1978 | Dilgren et al. | 166/272 |
| 4,148,217 | 4/1979 | Engle | 73/60.1 |
| 4,161,217 | 7/1979 | Dilgren et al. | 166/252 |
| 4,393,937 | 7/1983 | Dilgren et al. | 252/8.55 D X |
| 4,417,088 | 11/1983 | Miller | 585/533 |
| 4,445,573 | 5/1984 | McCaleb | 166/250 |
| 4,532,993 | 8/1985 | Dilgren et al. | 166/303 |

OTHER PUBLICATIONS

SPE 10774—"The Laboratory Development and Field Testing of Steam/Noncondensible Gas Foams for Mobility Control in Heavy Oil Recovery" by Richard E. Dilgren, Arthur R. Deemer and Kenneth B. Owens (Society of Petroleum Engineers of AIME) (1982).
SPE 10775—"Evaluation of a Conventional Steam Drive with Ancillary Materials: North Kern Front Field" by Rod L. Eson and Stephen K. O'Kesky, Chemical Oil Recovery Co., (Society of Petroleum Engineers of AIME) (1982).
SPE-10777—"Steam Surfactant Systems at Reservoir Conditions" by Ali Habib Al-Khafaji, Pin-Ton Fred Wang, Louis M. Castanier and William E. Brigham, Stanford Petroleum Research Institute (Society of Petroleum Engineers of AIME) (1982).
"Oil Recovery by Steam Drive with Ancillary Materials", DOE/BETC-8211, Progress Review 21, pp. 94-102 (1981).
SPE/DOE 9777—"Field Demonstration of Steam Drive with Ancillary Materials" by T. M. Doscher and E. C. Hammershaimb, CLD, Inc., Society of Petroleum Engineers, U.S. Department of Energy (1981).
"A Field Experiment of Steam Drive with In-Situ Foaming", by Olga P. Malito, Subir K. Sanyal and William E. Brigham, Second Annual Report–Oct. 1, 1981–Sep. 30, 1982, Stanford University, Petroleum Research Institute.
SPE 12785—"Laboratory Study of Foaming Surfactants as Steam-Diverting Additives" by J. H. Duerksen, Chevron Oil Field Research Co. (Society of Petroleum Engineers of AIME) (Apr., 1984).
"Surfactant Enhanced Steam Drives for Heavy Oil Recovery," Dilgren et al, American Oil Chemists Society Annual Meeting, Paper No. 279, May 1982.
"Cyclic Gas/Steam Stimulation of Heavy-Oil Wells", J. Petroleum Technology, Oct. 1981.

Primary Examiner—George A. Suchfield
Attorney, Agent, or Firm—S. R. LaPaglia; E. J. Keeling; A. Stephen Zavell

[57] ABSTRACT

An improved cyclic steam injection process for recovering hydrocarbons from a subterranean formation. The process includes the use of alpha-olefin sulfonate dimer surfactants in the steam to form a foam-steam drive medium which is injected into the formation through an injection well to enhance the recovery of hydrocarbons from said well when it is in a production well mode of operation.

31 Claims, No Drawings

4,607,700

ALPHA-OLEFIN SULFONATE DIMER SURFACTANT CYCLIC STEAM STIMULATION PROCESS FOR RECOVERING HYDROCARBONS FROM A SUBTERRANEAN FORMATION

BACKGROUND OF THE INVENTION

This invention relates to enhanced oil recovery. More specifically, this invention relates to a process of enhancing oil recovery with a cyclic steam injection.

Many hydrocarbons are too thick to be recovered from subterranean petroleum containing formations without assistance. These hydrocarbons are the virgin or residual heavy oils in the reservoir. These heavy hydrocarbons can be recovered through the use of steam drives which heat the formation, lower the viscosity of the hydrocarbons, and enhance the flow of the hydrocarbons from an injection well towards a production well.

However, not all formations are adaptable to a standard injection well-production well type of recovery operation. These types of formations can be subjected to cyclic steam stimulation. However, the steam tends to finger out into the formation volume surrounding the well. This limits the potential volume for enhanced oil recovery because the primary mechanisms for cyclic steam stimulation are viscosity reduction of the in-place oil and gravity drainage back to the injection well during the production cycle. Thus, the total amount of the formation that is reached by the steam injection is limited unless the steam can be forced away from those portions of the formation containing only residual oil saturation.

Residual oil saturation is defined as the immobile oil remaining in that portion of the reservoir swept by steam. Blocking the residually oil saturated portion of the formation from the preferential path of the steam injection would greatly increase the amount of recovered oil. However, any additives such as surfactants, must be able to penetrate the formation but not interfere with the recovery mechanisms of gravity drainage or viscosity reduction. Preferably, these additives should form a penetrating foam which preferentially moves into the residually oil saturated portion of the formation and permits the steam and water portion of the injected compositon to move into the portion of the formation containing recoverable hydrocarbons. Furthermore, any additive contained in the water phase portion of the injection composition should enhance the mobility of the remaining oil.

U.S. Pat. Nos. 3,463,231 and 3,953,338 teach the use of monomer and oligomers of materials referred to as alpha-olefin sulfonates as wellbore cleanout materials. They contain no teachings that the materials can be used in cyclic steaming operations. U.S. Pat. No. 4,393,937 suggests the use of alpha-olefin sulfonate monomers in an injection well-production well combination recovery process. However, the recited patents do not teach or appreciate or suggest any possibility of enhancing oil recovery in cyclic steam operations through the use of alpha-olefin sulfonate oligomers and preferably alpha-olefin sulfonate dimers.

To maximize the extraction of hydrocarbons from a formation, it would be highly desirable to have superior foaming surfactants which inhibit the flow of steam in a steam zone containing only residual oil saturation without inhibiting the backflow of hydrocarbons towards the injection well when it is placed in the production well mode of operation. Furthermore, it would be desirable to have the surfactants in a steam foam recovery process which inhibit the flow of the steam in the zone which contains only the residual oil and enhance the flow of steam in the zone which contains the recoverable hydrocarbons. However, it is desirable not to have the flow of the recoverable hydrocarbons inhibited from returning towards the injection well when it is operated in the production well mode of operation.

SUMMARY OF THE INVENTION

We have invented a cyclic foam surfactant steam process for recovering hydrocarbons from a subterranean formation. The process comprises the injection of a class of alpha-olefin sulfonate dimers wherein the monomers have an alkyl chain length of from about $C_5$ to about $C_{24}$ as foaming surfactants during steam injection phase at an injection well. Thereafter, the injection well is turned into a production well mode of operation with a resulting enhancement of recovery of hydrocarbons at the well. The process extends the useful life of cyclically steamed wells which had become steamed out and uneconomical producers. In addition, it enhances the rate of recovery from cyclically steamed wells that do not utilize our cyclic steam foam process.

The superior foaming characteristics of the alpha-olefin sulfonate dimers enhance the sweeping of the steam into the formation. This enhances the recovery of hydrocarbons when the injection well is operated in a production well mode. We also expect the foam surfactantsteam combination recovers additional hydrocarbons from the previously residual oil saturated portions of the formation swept by only steam. The foamable mixture of steam, surfactant and (optionally) non-condensible gas is injected into the formation at an injection well and displaced into the formation with either additional foamable mixture or steam alone. Thereafter, the injection well is operated as a production well to recover the hydrocarbons from the formation.

DETAILED DESCRIPTION OF THE INVENTION

The preferred alpha-olefin foaming surfactants' R factors were calculated and also evaluated with respect to other surfactants for steam foam drives in our U.S. Application Ser. No. 489,649 filed Apr. 28, 1983, now U.S. Pat. No. 4,556,107 said application completely and for all purposes incorporated herein by reference. Based on these calculations and further work, we conclude that alpha-olefin sulfonate dimers are ideal surfactants for cyclic steam foam drives. The alpha-olefin sulfonate dimers enhance the recovery of hydrocarbons without interfering with the gravity drainage mechanism necessary to permit the flow of the hydrocarbons back towards the injection-production well for recovery.

TABLE I

| Resistance Factor | Definition | Relation to Reservoir | Desired Value |
|---|---|---|---|
| $R_1$ | $\Delta P$ (Surfactant + Brine + optional | $\Delta P$ in stm zone at $S_{or}$ w/foam | High |

TABLE I-continued

| Resistance Factor | Definition | Relation to Reservoir | Desired Value |
|---|---|---|---|
| $R_2$ | $\dfrac{\Delta P \text{ (Brine + optional (NCD)} + S_{or})}{\Delta P \text{ (Sufactant + Brine + optional (NCD)} + S_{or})}$ | $\dfrac{\Delta P \text{ in stm zone at } S_{or} \text{ wo/foam}}{\Delta P \text{ in stm zone at } S_{or} \text{ w/foam}}$ | High |
| $R_3$ | $\dfrac{\Delta P \text{ (Surfactant + Brine + optional (NCD)} + S_o)}{\Delta P \text{ (Brine + optional (NCD)} + S_o)}$ | $\dfrac{\Delta P \text{ in stm zone at } S_o \text{ w/foam}}{\Delta P \text{ in stm zone } S_o \text{ w/foam}}$ | Low (pref. <1) |

$\Delta P$ = Pressure drop across foam generator
$S_{or}$ = Residual oil saturation
$S_o$ = Oil saturation ($S_o > S_{or}$)
Stm = Steam
w = with
wo = without
NCD = Non-condensible Gas The alpha-olefin surfactant of the present invention exhibited superior $R_1$–$R_3$ values in steam foam drive tests to standard sulfonate dimer surfactants, such as Siponate A168 ®, Thermophoam BW-D ® and Stepanflo 30 ®. These known surfactants are alpha-olefin sulfonates having an olefin chain from $C_{16}$–$C_{18}$. The results have lead us to conclude that the alpha-olefin sulfonate dimers are preferred materials for cyclic steam foam stimulations.

The surfactants of the invention are the dimers of alpha-olefin sulfonates wherein the monomers have a carbon chain length of from about $C_5$ to about $C_{24}$. In other words, the dimer has a chain length of $C_{10}$–$C_{48}$. The dimers derived from the monomers of $C_{11}$–$C_{20}$ alpha-olefin sulfonates are preferred. These preferred dimers are alpha-olefin sulfonate dimers in the range of $C_{22}$–$C_{40}$. The dimers of $C_{15}$–$C_{20}$ alpha-olefin sulfonates are most preferred. These most preferred dimers are alpha-olefin sulfonate dimers in the range of $C_{30}$–$C_{40}$. Mixtures of the alpha-olefin sulfonate dimers can be employed to optimize the recovery of hydrocarbons from a particular formation. The alpha-olefin sulfonate dimers can be prepared by any known process. For example, the dimers of the monomers are complex mixtures of compounds which can be prepared by heating the monomers at a temperature above about 110° C. as disclosed in U.S. Pat. No. 3,721,707, completely incorporated herein by reference. For convenience, the mixture which may contain hydroxyalkane sulfonic acids, alkane sultones, alkene sulfonic acids, and mixtures thereof are referred to as alpha-olefin sulfonate dimers. Of course, a specific dimer can be prepared by starting with a specific monomer. The dimer or oligomers disclosed in U.S. Pat. No. 3,721,707 and generically referred to herein as alpha-olefin sulfonate dimers are particularly preferred. We believe the two sulfonate groups on the alpha-olefin sulfonate dimers provide part of the benefit. Furthermore, the alpha-olefin sulfonate dimers can also be used in their salt or acid form.

Any standard method of creating a steam surfactant foam is suitable for use in the invention. Preferably, the method provides for the incorporation of a non-condensible gas, such as nitrogen, carbon dioxide, carbon monoxide, air and the like, into the steam foam surfactant combination. A preferred process of creating the foam and gravity override sweeping the formation is disclosed in U.S. Application entitled "Steam, NonCondensible Gas and Foam for Steam and Distillation Drives in Subsurface Petroleum Formation" by John H. Duerksen, filed Mar. 18, 1983, and assigned U.S. Ser. No. 476,642 now U.S. Pat. No. 4,488,598. The process disclosed therein is completely incorporated herein by reference. Alternatively, the procedures outlined in U.S. Pat. Nos. 4,086,964; 4,393,937; 4,085,800; and 3,412,793, completely incorporated herein by reference, can be used to create the foam but the process must be carried out cyclically according to our process.

The foam is created by heating water to its boiling point at formation pressure [212° F. (100° C.) or higher] to form a steam. For California heavy oil reservoirs the steam temperature is typically in the range 250°–400° F. Typically, 80 percent or less of the injected water is converted to steam in the boiler; the remainder is injected as hot water. Thereafter, the surfactant is injected into the wet steam in an amount of from about 0.01% to about 10% of the liquid phase of the steam. Preferably, the surfactant is injected in as small an amount as possible to enhance the oil recovery. This is on the order of about 0.1% to about 1% surfactant present in the liquid phase. Optionally, sufficient non-condensible gas is injected into the steam such that the gas phase composition is from about 1 to about 50% non-condensible gas and from about 99 to about 50% gaseous steam by volume. The wet steam with its associated surfactant and non-condensible gas is injected into an injection well at a rate determined by reservoir characteristics. Typically, steam is injected into the injection well at a rate of from about 100 to about 1000 barrels per day, (BPD), of cold water equivalent. Preferably, the rate is about 200 barrels per day of liquids. Optionally, the water for forming the steam can contain other additives which enhance its properties such as scale inhibitors, cosurfactants, and the like. The water can also contain salts.

The process is carried out in the following procedure to minimize the cost of the operation, although various times and amounts must be dictated by the specific reservoir conditions. Initially, a first slug of steam is injected into the formation for a sufficient time to form a steam zone and a hot water zone in the subterranean formation containing the hydrocarbons. This is usually about 1 to 10 days or longer and preferably about 2 days. Thereafter, steam and alpha-olefin sulfonate dimer surfactant and (optionally) non-condensible gas is injected for from about 3 days to about 30 days or longer and preferably 10 days at an alpha-olefin sulfonate dimer concentration of preferably about 0.5% in the liquid phase of the injected steam. Thereafter, the surfactant concentration is reduced to about 0.25% during a continued 7-day injection period. Thereafter, pure steam is injected for about 3 days. The injection well is then returned to a production mode until the recovery declines to an uneconomical rate. Optionally, the well can be shut in for from about 1 to 14 days prior to being returned to a production mode.

Having described the invention, it should be understood that modifications which would be obvious to the ordinary skilled artisan are contemplated to be within the scope of the invention. For example, the slugs of steam, surfactant and gas can be alternated with slugs of pure steam. Optionally, the slugs can be tapered compositionally from one slug into the next to form a smooth transition or steam-surfactant-gas injection can be continuous.

EXAMPLE

The following example will illustrate our process for a 22,000 barrel 80% steam quality at an injection rate of about 1000 barrels per day (B/d) cyclic steam injection. Of course, the parameters can be varied depending on the size of the injection. The liquid phase of the process is about 200 B/d at 900 psig @ about 535° F. It assumes 1000 psi 70% steam quality at the bottom of the well, i.e., 300 B/d liquids. During all the steam and steam and surfactant injections, $N_2$ gas is also injected at a rate of about 10 SCFM and 1000 psia at 545° F. along with the steam and steam and surfactant.

Initially, steam is injected into a well for about 2 days at a rate of about 1000 B/d and 80% steam quality at the surface, i.e., 2000 barrels. Next, steam plus alpha-olefin sulfonate dimer is injected at a concentration of about 0.5% for about 10 days at a rate of about 1000 B/d, i.e., 10,000 barrels. Thereafter, the surfactant concentration is cut back to about 0.25% for about 7 days at a rate of about 1000 B/d, i.e., 7000 barrels. Finally, pure steam is injected for about 3 days at a rate of about 1000 B/d, i.e., 3000 barrels. The well is then returned to the production mode and an economical rate of production is observed from the previously uneconomical well thus extending its life and recovering more hydrocarbons.

What is claimed is:

1. A cyclic steam-foam process of recovering hydrocarbons from a subterranean formation penetrated by a well comprising:
    injecting a steam and alpha-olefin sulfonate dimer foam at said well;
    displacing said steam and alpha-olefin sulfonate dimer foam out into the formation;
    terminating the injection of said steam and alpha-olefin sulfonate dimer foam; and
    recovering hydrocarbons from said well.

2. The process according to claim 1 wherein the alpha-olefin sulfonate dimer comprises of from about 0.01% to about 10% of the water phase of the steam.

3. The process according to claim 2 wherein a non-condensible gas in an amount of from about 1% to about 50% of the gaseous phase of said steam is injected with said steam at said well.

4. The process according to claim 3 wherein the non-condensible gas is selected from the group consisting of nitrogen, carbon dioxide, air, flue gas, $CH_4$, and carbon monoxide.

5. The process according to claim 4 wherein the alpha-olefin sulfonate dimer includes alpha-olefin sulfonate dimer in the range of $C_{10}-C_{48}$.

6. The process according to claim 5 wherein said alpha-olefin sulfonate dimer includes a mixture of alpha-olefin sulfonate dimer in the range of $C_{22}-C_{40}$.

7. The process according to claim 5 wherein the alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid and wherein the resulting oligomeric sulfonic acid is neutralized with ammonia, an alkali metal base, a calcium base, a magnesium base or a mixture thereof.

8. The process according to claim 7 wherein said straight chain alkene hydrocarbon is a mixture in the range of $C_5-C_{24}$.

9. The process according to claim 8 wherein said straight chain alkene hydrocarbon mixture is in the range of $C_{11}-C_{20}$.

10. The process according to claim 1 wherein the alpha-olefin sulfonate dimer includes alpha-olefin sulfonate dimer in the range of $C_{10}-C_{48}$.

11. The process according to claim 10 wherein the alpha-olefin sulfonate dimer includes a mixture of alpha-olefin sulfonate dimer in the range of $C_{10}-C_{48}$.

12. The process according to claim 11 wherein the alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid.

13. The process according to claim 12 further comprising injecting steam into the formation prior to the injection of said steam and alpha-olefin sulfonate dimer.

14. The process according to claim 13 wherein steam is injected into the formation after the injection of said steam and alpha-olefin sulfonate dimer.

15. The process according to claim 14 wherein said steam injection is tapered into a steam and alpha-olefin sulfonate dimer injection which is tapered into a steam injection.

16. The process according to claim 15 wherein the salt form or the acid form of said alpha-olefin sulfonate dimer is employed.

17. The process according to claim 16 wherein a non-condensible gas in an amount of from about 1% to about 50% of the gaseous phase of said steam is injected into said steam prior to the injection of said steam at said well.

18. The process according to claim 17 wherein said straight chain alkene hydrocarbon is a mixture in the range of $C_5-C_{24}$.

19. The process according to claim 18 wherein said straight chain alkene hydrocarbon mixture is in the range of $C_{11}-C_{20}$.

20. The process according to claim 1 wherein the alpha-olefin sulfonate dimer comprises of from about 0.1% to about 10% of the water phase of the steam.

21. The process according to claim 20 wherein said alpha-olefin sulfonate dimer includes alpha-olefin sulfonate dimer in the range of $C_{10}-C_{48}$.

22. The process according to claim 21 wherein the alpha-olefin sulfonate dimer includes a mixture of alpha-olefin sulfonate dimer in the range of $C_{10}$–$C_{48}$.

23. A cyclic steam process for recovering hydrocarbons from a subterranean hydrocarbon bearing formation penetrated by a well, said process comprising:
injecting a steam and alpha-olefin sulfonate dimer at said well and out into said formation and away from said well, wherein said alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligomeric disulfonic acid and wherein the resulting oligomeric sulfonic acid is neutralized with ammonia, an alkali metal base, a calcium base, a magnesium base or a mixture thereof;
terminating the injection of said steam and alpha-olefin sulfonate dimer; and
recovering hydrocarbons at said well.

24. The process according to claim 23 wherein the alpha-olefin sulfonate dimer comprises from about 0.1% to about 10% of the liquid phase of the steam.

25. The process according to claim 24 wherein said foam further contains a non-condensible gas selected from the group consisting of nitrogen, carbon dioxide, air, flue gas, $CH_4$ and carbon monoxide.

26. The process according to claim 25 wherein said straight chain alkene hydrocarbon is a mixture of $C_5$–$C_{24}$ hydrocarbons.

27. The process according to claim 26 wherein said mixture is a $C_{11}$–$C_{20}$ mixture.

28. The process according to claim 23 wherein said alpha-olefin sulfonate dimer includes a mixture of alpha-olefin sulfonate dimer in the range of $C_{22}$–$C_{40}$.

29. Cyclic steam injection process for recovering hydrocarbons from a hydrocarbon containing subterranean formation penetrated by a well, said process sequentially comprises:
(a) injecting sufficient wet steam into the hydrocarbon bearing formation to form a steam zone and a hot water zone therein; thereafter
(b) continuting to injecting steam and adding alpha-olefin sulfonate dimer thereto, wherein said alpha-olefin sulfonate dimer is about 1% of the water phase of said steam and said alpha-olefin sulfonate dimer is a mixture of alpha-olefin sulfonate dimer within the range of $C_{10}$–$C_{48}$; thereafter
(c) terminating the injection of said steam and alpha-olefin sulfonate dimer; and, thereafter
(d) producing hydrocarbons from said hydrocarbon containing subterranean formation through said well.

30. The process according to claim 29 wherein said well is shut in for a predetermined period before producing said hydrocarbons in Step d.

31. The process according to claim 30 wherein said alpha-olefin sulfonate dimer is synthesized according to the oligomerization process which comprises heating in the liquid phase the sulfonation product of the reaction of sulfur trioxide with a straight chain alkene hydrocarbon having a carbon atom content in the range of from about 5 to 24, wherein the heating is at a temperature above about 110° C. and below the carbonization temperature of the sulfonate, is effected in the substantial absence of water, and is continued for a period at least sufficient for a significant conversion of the sulfonate feed to the corresponding oligormeric disulfonic acid.

* * * * *